United States Patent
Ruppert

(10) Patent No.: US 12,397,772 B2
(45) Date of Patent: Aug. 26, 2025

(54) POWER ELECTRONICS ARRANGEMENT FOR A MOTOR VEHICLE AND METHOD FOR PRODUCTION OF A POWER ELECTRONICS ARRANGEMENT FOR A MOTOR VEHICLE

(71) Applicant: AUDI AG, Ingolstadt (DE)

(72) Inventor: Daniel Ruppert, Lenting (DE)

(73) Assignee: Audi AG, Ingolstadt (DE)

( * ) Notice: Subject to any disclaimer, the term of this patent is extended or adjusted under 35 U.S.C. 154(b) by 666 days.

(21) Appl. No.: 17/668,219

(22) Filed: Feb. 9, 2022

(65) Prior Publication Data

US 2022/0266812 A1 Aug. 25, 2022

(30) Foreign Application Priority Data

Feb. 10, 2021 (DE) .......................... 102021103046.3

(51) Int. Cl.
*B60W 10/26* (2006.01)
*B60L 58/26* (2019.01)
(Continued)

(52) U.S. Cl.
CPC ............ *B60W 10/26* (2013.01); *B60L 58/26* (2019.02); *H01M 10/613* (2015.04);
(Continued)

(58) Field of Classification Search
CPC .... B60L 58/26; B60L 3/003; B60L 2240/525; B60L 2240/545; B60W 10/26; H01M 10/613; H01M 10/625; H01M 2220/20; H02J 7/00; H02J 7/0063; H02J 2310/48; H02M 1/00; H02M 1/32; H02M 1/34; H05K 7/20854
(Continued)

(56) References Cited

U.S. PATENT DOCUMENTS

2013/0272043 A1 10/2013 Sano et al.
2018/0352653 A1* 12/2018 Kahrimanovic .. H01L 23/49582
2019/0131208 A1* 5/2019 Feichtinger .......... H05K 1/0204

FOREIGN PATENT DOCUMENTS

CN       101640495 A    2/2010
CN       109004847 A    12/2018
(Continued)

OTHER PUBLICATIONS

English Translation Description FR2625831A1 (Year: 1989).*
English Translation Description DE102016222550B4 (Year: 2018).*
English Translation JP2015220810A Inverter Device (Year: 2015).*

*Primary Examiner* — Eman A Alkafawi
*Assistant Examiner* — Courtney G McDonnough
(74) *Attorney, Agent, or Firm* — Seed Intellectual Property Law Group LLP

(57) ABSTRACT

A power electronics arrangement for a motor vehicle comprises at least one power electronics circuit having at least one temporary storage for electrical energy, a discharge circuit associated with the power electronics circuit for discharging the temporary storage, having a discharge resistance, and a cooling device for cooling the power electronics arrangement, wherein the cooling device comprises a metallic cooling sink, the cooling sink being covered at least partly by an electrically insulating insulator layer, on which the discharge resistance is arranged as a conductor track.

18 Claims, 4 Drawing Sheets

(51) Int. Cl.
*H01M 10/613* (2014.01)
*H01M 10/625* (2014.01)
*H02J 7/00* (2006.01)

(52) U.S. Cl.
CPC ......... *H01M 10/625* (2015.04); *H02J 7/0063* (2013.01); *B60L 2240/545* (2013.01); *H01M 2220/20* (2013.01)

(58) Field of Classification Search
USPC ........................................................ 324/511
See application file for complete search history.

(56) References Cited

FOREIGN PATENT DOCUMENTS

| | | | | |
|---|---|---|---|---|
| CN | 109757076 A | | 5/2019 | |
| DE | 10204200 A1 | | 8/2003 | |
| DE | 102016222550 A1 | * | 5/2018 | ........... B29C 70/081 |
| DE | 11 2017 001 217 T5 | | 12/2018 | |
| DE | 102017211685 A1 | * | 1/2019 | ............... H01C 3/12 |
| FR | 2625831 A | * | 7/1989 | ............. G01F 23/60 |
| GB | 2284938 A | * | 6/1995 | ............... H01C 1/08 |
| JP | 2015220810 A | * | 12/2015 | ............... H02M 7/48 |
| JP | 2017-69371 A | | 4/2017 | |

* cited by examiner

POWER ELECTRONICS ARRANGEMENT FOR A MOTOR VEHICLE AND METHOD FOR PRODUCTION OF A POWER ELECTRONICS ARRANGEMENT FOR A MOTOR VEHICLE

BACKGROUND

Technical Field

Embodiments of the invention relate to a power electronics arrangement for a motor vehicle, comprising at least one power electronics circuit having at least one temporary storage for electrical energy, a discharge circuit associated with the power electronics circuit for discharging the temporary storage, having a discharge resistance, and a cooling device for cooling the power electronics arrangement, wherein the cooling device comprises a metallic cooling sink. Embodiments of the invention also relate to a method for production of such a power electronics arrangement.

Description of the Related Art

Hybrid and electric vehicles, and thus motor vehicles comprising an electric motor operated by a high-voltage battery, are already known in the prior art. Such electrified motor vehicles have an onboard high-voltage network, to which are connected power electronics arrangements, in addition to the electric motor and the high-voltage battery. Such power electronics arrangements provide, for example, power electronics circuits like a drive inverter, DC converter, onboard charger (OBC), electrical air conditioning compressors and/or electrical heaters. Examples of voltage systems in high-voltage networks of electrified motor vehicles lie in the range of 350-860 V DC voltage.

Power electronics circuits of such power electronics components often have temporary storages for electrical energy, such as intermediate circuit capacitors and/or EMC X-capacitors. If such a temporary storage is provided as an electrical energy storage, the power electronics arrangement must also have a discharge circuit for the active discharging of the temporary storage for reasons of safety of use and functional safety, and this is usually a semiconductor switch element and a discharge resistance, i.e., an ohmic load across which the energy of the temporary storage can be converted into heat during the discharging. Yardsticks exist for the active discharging process in regard to the discharge times and the minimum voltage levels.

For the specific implementation of the discharge circuit, it is known how to design at least the discharge resistance as a self-standing, massive module. The extremely massive design of the discharge resistance is necessary on account of the high intermediate circuit voltage of the temporary storage and the high discharge power, so that it can withstand the thermal loading associated with the discharge. The result is a large, heavy-footprint discharge resistance, which is screwed in separately inside the power electronics arrangement.

In another embodiment of the prior art it is proposed to construct the discharge resistance on a circuit board from a plurality of small resistors, for example, 20 to 100 pulse-resistant SMD thick-layer resistors. In such configurations, besides the high costs of the individual resistors, there is the drawback that they require a substantial space on the circuit board and generate a large heat input on the circuit board during operation.

In summary, the discharge circuit according to the known configurations is realized with discrete components on traditional circuit boards and/or as self-standing structural units. The cooling of the discharge circuit, especially the discharge resistance, occurs by free convection with air at ambient temperature inside the power electronics arrangement. Requirements also exist in regard to the discharge circuit from the standpoint of the functional safety, for example, that the active discharge can be carried out repeatedly in immediate succession and that the energy stored in the intermediate circuit in the temporary storage can be converted into heat, which in turn lead to high requirements on robustness and service life. This is responsible for the complex design of the discharge circuit, especially the discharge resistance. In the most unfavorable case, multiple discharge resistors are necessary, due to the large power loss.

Thus, on the whole, there are many drawbacks with such traditional discharge circuits. Thus, there is a large cost expense for material costs, especially as regards the discharge resistors. The construction and connection engineering, as well as the connecting of the discharge resistors, may also entail high costs. Owing to a poor cooling contact, the discharge circuit may need to be overdimensioned. An additional temperature metering may be needed to monitor the discharge resistors. Additional design space or additional room on the circuit board may be required.

Moreover, high development costs and high development expenses exist. These pertain for example to the integration expense of the discharge resistors on the circuit board or inside a housing of the power electronics arrangement. Moreover, one may mention the design of the discharge circuit with corresponding thermal mass and additional filtering or interference suppression measures for the temperature metering. Even so, there remains a rather poor robustness for the discharge circuit and specifically for the discharge resistance. Due to the active discharge, there may also occur a thermal input in the power electronics circuit or circuit board. Furthermore, due to the thermal loading, the service life of the discharge circuit is also impaired, as well as that of the power electronics circuit, if there is a thermal input in the power electronics circuit.

DE 11 2017 001 217 T5 relates to a power resistance for heat dissipation, which is used in a vehicle as a continual discharge resistance. The resistance encompasses a resistance substrate with pair electrodes and a resistance element. Moreover, an external insulating material is provided, covering at least the top side and the side surface of the resistance substrate. A secured insulating leakage path is provided between the conductor sections of the resistance and the metal housing in which the resistance is accommodated. Hence, this constitutes an example of a discharge resistance configured as a self-standing structural unit, and therefore a discrete component, where it can be provided that the discharge resistance can be fastened by means of a screw to a cooling sink.

JP 2017 069 371 A relates to a discharge resistance device with a heat dissipator, which is supposed to be designed for a weight savings while assuring a reliable cooling of the discharge resistance. Here, a first resistor and a second resistor are fastened side by side on a surface of an insulator, with a metal layer and a heat dissipator laminated on the other side. The resistors are mounted as discrete components.

US 2013/0272043 A1 relates to an electrical power converter having a heat dissipator, a circuit board, a capacitor, and a discharge resistance for the capacitor. A semiconductor module, the capacitor, and the discharge resistance are arranged here on a main surface of the circuit board. A discrete resistance element can also be mounted on a heat dissipator here.

BRIEF SUMMARY

Some embodiments provide a power electronics arrangement for a motor vehicle which is improved in particular as regards the space requirement and the heat dissipation of a discharge resistance.

In some embodiments, a cooling sink is covered at least partly by an electrically insulating insulator layer, on which the discharge resistance is arranged as a conductor track.

In some embodiments, a discharge resistance as a resistance structure is applied directly on the cooling sink within the power electronics arrangement as a conductor track. Thanks to the direct application on the cooling sink and the resulting minimization of the thermal resistance, improved heat transfer can occur. One achieves a design having no independent thermal mass and moreover allowing new degrees of freedom for the integration. The discharge resistance is designed as an especially meandering conductor track, as opposed to the usual discrete electronic components heretofore. In some embodiments, it may be provided that the cooling sink, the insulator layer, and a conductor layer forming the conductor track form an IMS structure, where IMS stands for "Insulated Metal Substrate," where the cooling sink can be considered to be the metal substrate, which is covered by a thin insulator layer made of a dielectric, which is then followed by the thin conductive layer of which the conductor tracks consist. In this case, but also in general, the cooling sink may advisedly consist of aluminum and/or the conductor track may consist of copper and/or the insulator layer may comprise a polymer and/or a ceramic and/or a prepreg material. Cooling sinks for power electronics arrangements made of aluminum have basically already been proposed, while copper is often employed to realize conductor tracks on circuit boards. In some embodiments, a copper foil is laminated by means of a prepreg material on the cooling sink, consisting of aluminum, for example. "Prepreg" is used here in short for "preimpregnated fibers," where a reaction resin is normally used for the impregnation, such as epoxy resin. Prepreg materials are semifinished textile fiber matrix products, which can be used in automated processes in order to apply the insulator layer at least partly on the cooling sink and thus serve as the foundation for the conductor track, which may be produced from a copper foil. In other words, a copper foil laminated by means of prepreg material on the cooling sink can then be structured howsoever is desired; here, in order to create the discharge resistance. Customary methods employing masks can be used for this, for example.

Thus, in the end one gets a layered structure, in which at first the insulation layer of dielectric, which may have a thickness of 50 µm to 200 µm, is applied on the cooling sink, and then on this is placed the conductor track layer, especially as a copper layer, which may have a thickness of 20 µm to 400 µm. The insulator layer may be kept as thin as possible, in order to provide a good heat dissipation in the direction of the cooling sink.

The conductor track forming the discharge resistance here may be meandering. Such a design offers ideal space utilization and a two-dimensional contact with the cooling sink, making possible a sufficiently large area and improved heat transfer from the conductor track to the cooling sink and at the same time providing a much more compact design.

In general, thus, it can be said that the discharge circuit can be significantly simplified in power electronics arrangements, i.e., high-voltage components. Thanks to placing the discharge resistance against the cooling sink, the discharge resistance can be significantly reduced, in particular, it can be designed as a meandering conductor track. This makes possible new design forms without their own thermal mass. Besides significant savings potential for design space and costs, the service life and robustnesss of the discharge circuit is furthermore increased. This greatly increases the flexibility in the location of the discharge resistance. Thus, it can be placed on all cooling surfaces within the power electronics arrangement, especially a housing of the power electronics arrangement, and need not be arranged on a circuit board, for example.

In summary, therefore, thanks to the proposed cooling contact there is a reduction in the cost expense for material costs, namely, low material costs for the discharge resistance, since a simple realization of the copper conductor track as an electrical resistance (ohmic load) is possible. One no longer needs to have a plurality of discharge resistors on a circuit board. The cost expense is also significantly reduced in the production and assembly, as shall be further explained in regard to the method described herein, since only the lamination and structurization is necessary. The robustness of the discharge circuit for the active discharging of the temporary storage is generally enhanced thanks to the excellent connection to the especially active cooling process, since the thermal stress is reduced and thus the service life is increased. Since only one copper conductor track is needed as the discharge resistance, the weight of the discharge circuit is significantly reduced, as is the required design space or design size. The flexibility is enhanced, since the discharge resistance can be adapted to cooling surfaces of the cooling sink with maximum flexibility.

The discharge circuit may furthermore comprise a semiconductor switch, which is likewise arranged on the insulator layer of the cooling sink. Thanks to the use of the insulator layer, as in such an IMS structure, a component substrate is ultimately provided on which further components of the discharge circuit can be arranged, after suitable structurization in terms of the conductor track, especially the customary semiconductor switch, which can be designed for example as an IGBT and/or a MOSFET. Hence, an improved heat dissipation is also possible for the semiconductor switch.

A further particular advantage is that there exists a great freedom of design, especially when configuring the conductor track by structurization from a metal layer, especially a copper layer, and therefore the discharge resistance can be adapted optimally to the requirements. Thus, it can be provided that the thickness and the length of the conductor track are chosen so as to dictate a predetermined resistance value for the discharge resistance. For example, the electrical resistance value can be dictated by producing a special meandering conductor track structure in dependence on the thickness and length of the conductor track. By variation of the meandering or generally the conductor track length and thickness, an extremely precise choice of the electrical resistance value is possible. The heat produced in the discharge resistance by the electrical power loss is dissipated over a large area in contact with the cooling sink and thus in the best possible manner during the active discharging of the temporary storage.

Thanks to the additional mounting of the semiconductor switch of the discharge circuit, this becomes entirely realized on a surface of the cooling sink and the semiconductor switch can also have its heat dissipated directly and through the cooling sink.

Compact power electronics arrangements have already been proposed in the prior art, in which the power electronics circuits realized as power electronics modules can be mounted directly on the cooling device, especially also on the cooling sink. In the context of the present embodiments, it is now possible to utilize free-standing portions of the surface of the cooling sink for the mounting of the extremely small-sized discharge circuit.

Thus, in some embodiments, at least one power electronics circuit is incorporated in a power electronics module, and the power electronics module is mounted on the cooling sink. In other words, the power electronics modules can form structural units which are connected directly to the cooling sink for the cooling, thus, they are mounted on them in particular. In this regard, the cooling sink may comprise in its interior a duct through which a coolant can flow and for the power electronics module to comprise a cooling structure, with the cooling structure protruding into the duct. The cooling structure may be formed, for example, by fins. In the basic condition, therefore, the cooling sink comprises the duct with openings, through which a coolant can flow, and at least one power electronics module can be inserted into the openings so that the cooling structure protrudes into the cavity forming the duct. The power electronics module is then secured in tight manner, for example, by being firmly screwed in and/or welded. Thus, the cooling structure of the power electronics module is flushed directly by the coolant, which may generally be water in particular, also making possible an excellent cooling for the power electronics circuits. The cooling structure may be formed in particular by so-called "pinfins," and thus by a plurality of pinlike cooling fins.

In one embodiment, the power electronics arrangement may be, for example, an inverter arrangement for a synchronous machine as the drive motor of a motor vehicle, and then a number of inverter modules realized as individual components corresponding to the number of phases of the synchronous machine may be provided, being mounted accordingly on the cooling sink. In electrified motor vehicles, such as purely electrical motor vehicles (EV), hybrid-electric vehicles (HEV) and/or plug-in hybrid-electric vehicles (PHEV), three-phase electric motors (synchronous machines) are usually provided as the electrical traction drive. The inverter then serves for the connection to the onboard high-voltage network using DC voltage. Of course, however, other specific configurations of the power electronics arrangement are conceivable, such as a DC converter or the like. It should be generally noted that multiple discharge circuits may also be provided of course in multiple power electronics circuits, especially in power electronics modules, in particular, one for each power electronics circuit having a temporary storage.

In a configuration with power electronics module mounted on the cooling device, specifically the cooling sink, the conductor track of the discharge resistance may be situated in a side margin region of the cooling sink, adjacent to the at least one power electronics module, especially adjacent to the cooling duct, and/or in the region of a coolant inlet or coolant outlet of the cooling sink. The locating of the active discharge on the cooling sink may therefore occur, for example, at the side margin adjacent to the at least one power electronics module, for example, in the regions where the coolant inlet and the coolant outlet of the coolant duct are provided, so that there is also proximity to the circulating coolant for the active cooling. Furthermore, these heretofore unused portions will be utilized.

The ultimately adjacent arrangement of the discharge circuit and the power electronics module also allows for an especially easily achieved contacting process. Thus, for example, it can be provided that the discharge circuit arranged entirely on the insulator layer is electrically contacted by the power electronics module through contacts at contact points. For example, needle contacts are conceivable here. The power electronics module is then advisedly mounted on the cooling sink, after the mounting of the discharge resistance, such as the entire discharge circuit, so that this mounting also brings about the contacting with the discharge circuit in fully automatic manner, so that the temporary storage, especially an intermediate circuit capacitor, of the power electronics circuit can be discharged via the discharge circuit.

Besides the power electronics arrangement, embodiments of the invention also relate to a method for production of such a power electronics arrangement. A method for production of a power electronics arrangement for a motor vehicle, wherein the power electronics arrangement comprises at least one power electronics circuit having at least one temporary storage for electrical energy, a discharge circuit associated with the power electronics circuit for discharging the temporary storage, having a discharge resistance, and a cooling device for cooling the power electronics arrangement, wherein the cooling device comprises a metallic cooling sink, is characterized in that the discharge resistance is realized as a conductor track on an electrically insulating insulator layer of the cooling sink. All remarks pertaining to the power electronics arrangement described herein may be applied analogously to the method and vice versa. In particular, the same benefits can thereby be achieved.

In an embodiment, it may be proposed that the insulator layer is applied as a prepreg material. The fibers may be pre-impregnated with a resin, which hardens after being put in place, in order to form the insulator layer. The insulator layer may have a thickness between 50 and 200 µm, for example.

At first, a closed metallic layer, especially a copper layer, and/or a foil can be applied to the insulator layer, from which the conductor track forming the discharge resistance is formed, especially by making use of a mask. The metal layer, especially a copper foil, can then be laminated on by the already described prepreg process. Hence, the insulator layer will serve as a means of fastening for the metal layer, especially the copper foil. In addition, it constitutes the electrical insulation between the cooling sink, consisting in particular of aluminum, and the metal layer.

After this, the metal layer can be ultimately structured howsoever is desired, by forming at least the conductor track forming the discharge resistance, which may be meandering. In this regard, but also in general, it can be provided that the length and the thickness of the conductor track are chosen so as to dictate a predetermined resistance value for the discharge resistance. In one concrete embodiment, for example, it can be provided that customary structurization methods are used for a copper foil laminated by means of the prepreg material, especially making use of a mask or the like.

A semiconductor switch of the discharge circuit can also be positioned on the insulator layer, connected to the conductor track. In particular, the structure produced by the insulation layer and the metal layer/conductor track can be considered to be an IMS structure, which can then also serve for the mounting of components other than the conductor track structures, in the present case in particular a semiconductor switch of the discharge circuit. The semiconductor switch can be, for example, an IGBT or a MOSFET.

In one modification of the method, it may be provided in this context that the power electronics circuit realized as a power electronics module, after the realization of the discharge resistance, also especially after the applying of the semiconductor switch to the cooling sink, is mounted on the cooling sink such that contacts provided on the power electronics module electrically contact the discharge circuit at contact points. The configuration in particular may be such that the mounting of the power electronics module also automatically produces the electrical contacting with the discharge circuit.

It should be remarked at this place, both for the power electronics arrangement and also for the method, that it is also basically conceivable to provide only the discharge resistance on the surface of the cooling sink. Other portions of the discharge circuit, such as the semiconductor switch, can then be provided also by other components, especially in the power electronics module. Also in such cases a simple contacting is also possible, of course, since it occurs ultimately within the discharge circuit.

BRIEF DESCRIPTION OF THE SEVERAL VIEWS OF THE DRAWINGS

Other benefits and details will emerge from the following described embodiments and with the aid of the drawings.

DETAILED DESCRIPTION

Figure 1:
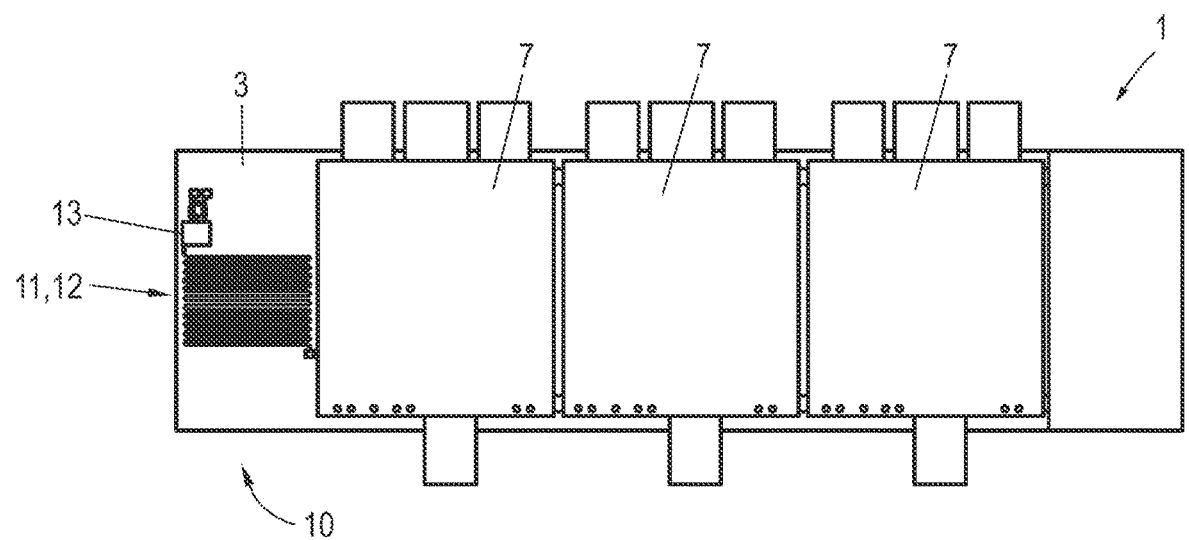
FIG. 1 shows a view of a power electronics arrangement of a first embodiment.
Figure 2:
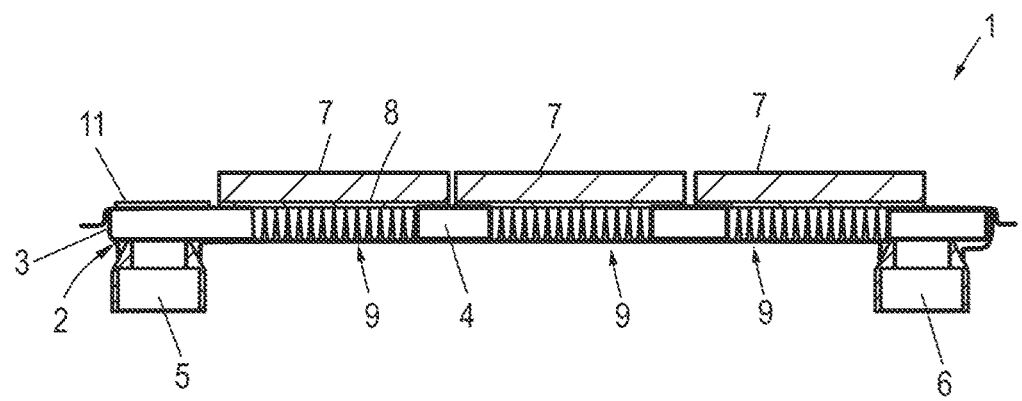
FIG. 2 shows a cross section through the power electronics arrangement of FIG. 1.

FIGS. 1 and 2 show a front view and a cross section of major components of a power electronics arrangement 1 of a first embodiment. Of the cooling device 2, for sake of simplicity, only a cooling sink 3 is shown, being formed from aluminum in the present case. The cooling sink 3 defines a cavity in its interior, serving as a duct 4 for coolant and therefore being connected to an inlet 5 for the coolant and an outlet 6 for the coolant.

The power electronics arrangement 1 furthermore comprises power electronics modules 7, shown here only schematically, which are mounted on the cooling sink 3, as can be seen. For example, these might be inverter modules for different phases, but also other power electronics modules realizing other power electronics circuits. Each power electronics module 7 comprises a cooling plate 8, on the underside of which is arranged a cooling structure 9, which may comprise for example pinlike cooling fins. The cooling structure 9 and at least a lower portion of the cooling plate 8 likewise consist of aluminum. The cooling structure 9 protrudes through a top opening of the cooling sink 3 into the duct 4, where it is bathed in the flowing coolant, here: water, for a forced convection and thus a cooling. In order to close off the duct 4 from the outside, the power electronics modules 7 can be welded all around the opening to the cooling plate 3, for example by laser welding.

In its side margin region 10, there is arranged on the surface of the cooling sink 3 in the present instance a discharge circuit 11 having a discharge resistance 12 and a semiconductor switch 13, such as an IGBT or a MOSFET, in addition to the power electronics modules 7. The discharge circuit 11 serves for the active discharging of at least one temporary storage for electrical energy of at least one of the power electronics modules 7. The temporary storage, not shown more closely for sake of simplicity, may be for example an intermediate circuit capacitor.

Figure 3:
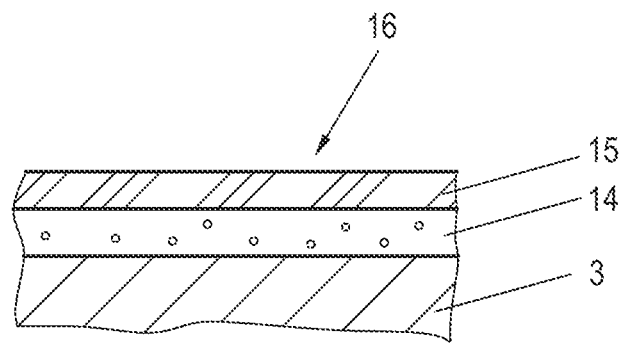
FIG. 3 shows a layer structure in the region of a discharge circuit.
Figure 4:
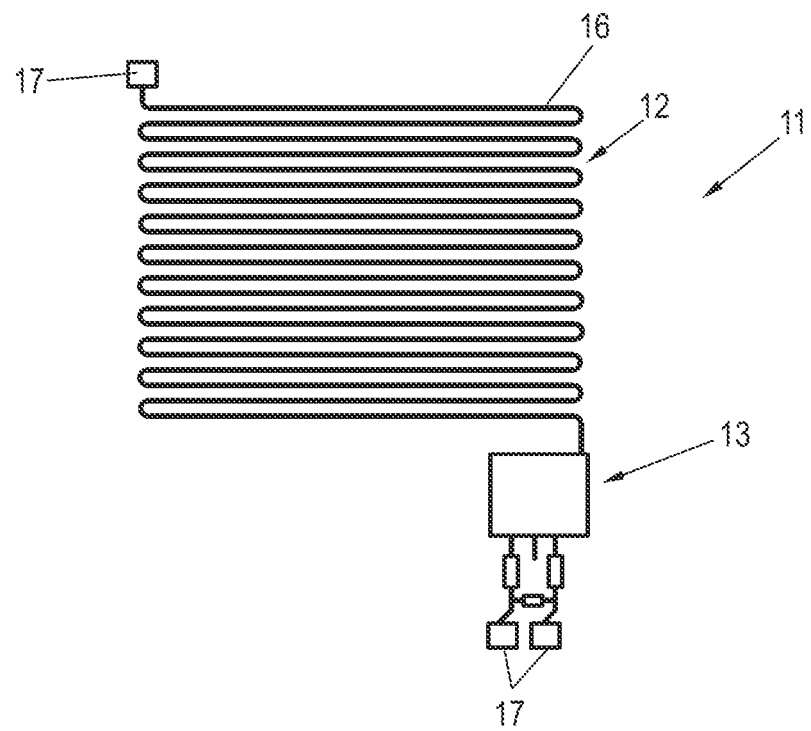
FIG. 4 shows the discharge circuit.

In order to realize the discharge circuit 11 on the initially metallic surface of the aluminum cooling sink 3, at first a layer structure is put in place locally in the margin region 10, as shown more closely in FIG. 3. Accordingly, an electrically insulating insulator layer 14 consisting of a dielectric is arranged on the cooling sink 3, followed by a copper foil 15 as the metal layer, having been structurized in order to create the discharge resistance 12 as a conductor track 16, also see FIG. 4, which is meandering in form here, as well as to provide common contact points 17 or surfaces for the semiconductor switch 13.

In the present instance, a prepreg material was used for the insulator layer 14, in order to also laminate the copper foil 15 directly with its creation. Techniques known for IMS structures may be used. After this, the structurization is done with the aid of a predetermined resistance value for the discharge resistance 12, such that the predetermined resistance value results from the thickness and length of the conductor track 16. After this, the semiconductor switch 13 (as well as other components, if applicable) can be put in place. Only then in the production process is it time to mount the power electronics modules 7, inasmuch as these have contacts, not further shown in the figures for sake of clarity, which automatically make contact with the corresponding contact points 17 during the mounting process. Of course, other contacting possibilities are also basically conceivable, such as bonding.

The mounting of the discharge circuit 11 on the cooling sink 3 corresponds to a use of the IMS technology, so that it involves an IMS structure. The insulator layer 14 here has a thickness of 50 µm to 200 µm, while the copper foil 15 as a copper layer can have a thickness of 20 µm to 400 µm.

In summary, the configuring of the cooling sink 3 in the margin regions 10 next to the power electronics modules 7 thus enables a location for the discharge circuit 11 for the active discharging, thus also resulting in a cooling connection for the discharge resistance 12 and, in the present embodiment, also for the semiconductor switch 13. If respective discharge circuits 11 are provided for different power modules, it is of course also conceivable to place more than the illustrated discharge circuit 11 on the cooling sink 3.

Figure 5:
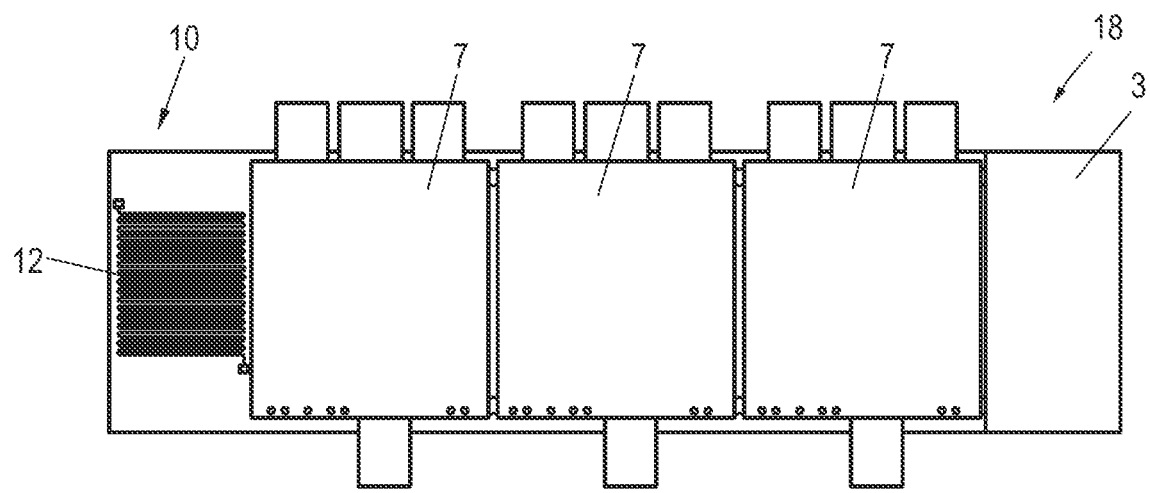
FIG. 5 shows a view of a power electronics arrangement according to a second embodiment.
Figure 6:
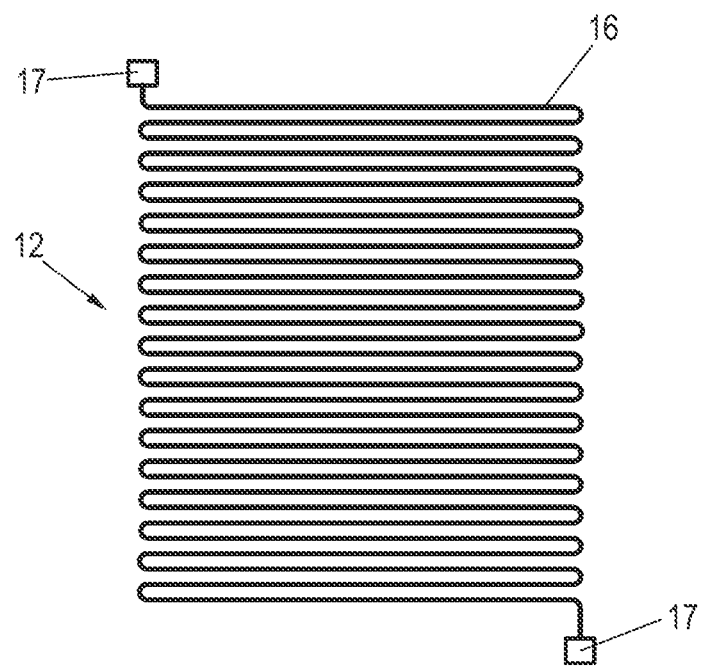
FIG. 6 shows a discharge resistance in the second embodiment.

FIGS. 5 and 6 explain an alternative, second embodiment of a power electronics arrangement 18. In this embodiment, only the discharge resistance 12 of the discharge circuit 11 is shown as a meandering conductor track 16 on the cooling plate 3.

Figure 7:
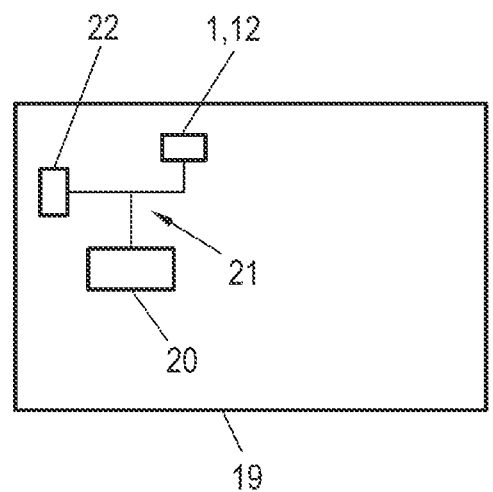
FIG. 7 shows a basic diagram of a motor vehicle.

FIG. 7 shows a basic diagram of a motor vehicle 19. The motor vehicle 19 may be, for example, an electric vehicle or a hybrid vehicle. For this, the motor vehicle 19 comprises an electric motor 20 in its drive train, which can be designed for example as a synchronous machine. The electric motor 20 may be energized by a high-voltage battery 22 through a high-voltage network 21, whose voltage may be for example in the region of 350-860 V high-voltage, or it may be charged in generator mode. Now, at least one power electronics arrangement 1, 18 is provided in the high-voltage network 21. For example, this can be connected to the electric motor 20 as an inverter unit or it can form a connection to an onboard low-voltage network of the motor vehicle 19 as a DC converter.

German patent application no. 10 2021 103046.3, filed Feb. 10, 2021, to which this application claims priority, is hereby incorporated herein by reference in its entirety.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A power electronics arrangement for a motor vehicle, comprising: at least one power electronics circuit having at least one temporary storage for electrical energy; a discharge circuit associated with the power electronics circuit for discharging the temporary storage, having a discharge resistance; and a cooling device for cooling the power electronics arrangement, wherein the cooling device comprises a metallic cooling sink wherein the cooling sink is directly covered at least partly by an electrically insulating insulator layer on which the discharge resistance is arranged as a conductor track, wherein the cooling sink, the insulator layer, and a conductor layer forming the conductor track form an insulated metal substrate (IMS) structure, and wherein the cooling sink comprises a cooling duct on an inside thereof, through which a coolant can flow, and the power electronics module comprises a cooling structure, and the cooling structure extends into the cooling duct within the cooling sink.

2. The power electronics arrangement according to claim 1, wherein the cooling sink consists of aluminum.

3. The power electronics arrangement according to claim 1, wherein the conductor track consists of copper.

4. The power electronics arrangement according to claim 1, wherein the insulator layer comprises a polymeric, ceramic, and/or prepreg material.

5. The power electronics arrangement according to claim 1, wherein the conductor track forming the discharge resistance is meandering.

6. The power electronics arrangement according to claim 1, wherein the discharge circuit furthermore comprises a semiconductor switch, which is likewise arranged on the insulator layer of the cooling sink.

7. The power electronics arrangement according to claim 1, wherein a thickness and a length of the conductor track are chosen so as to dictate a predetermined resistance value for the discharge resistance.

8. The power electronics arrangement according to claim 1, wherein the at least one power electronics circuit is incorporated in a power electronics module, and the power electronics module is mounted on the cooling sink.

9. The power electronics arrangement according to claim 1, wherein the conductor track of the discharge resistance is situated in a side margin region of the cooling sink, adjacent to the at least one power electronics module.

10. The power electronics arrangement according to claim 9, wherein the conductor track of the discharge resistance is situated in the side margin region of the cooling sink, adjacent to the cooling duct.

11. The power electronics arrangement according to claim 9, wherein the conductor track of the discharge resistance is situated in the side margin region of the cooling sink, in the region of a coolant inlet or a coolant outlet of the cooling sink.

12. The power electronics arrangement according to claim 8, wherein the discharge circuit arranged entirely on the insulator layer is electrically contacted by the power electronics module via contacts at contact points.

13. A method, comprising: producing a power electronics arrangement for a motor vehicle, wherein the power electronics arrangement comprises at least one power electronics circuit having at least one temporary storage for electrical energy, a discharge circuit associated with the power electronics circuit for discharging the temporary storage, having a discharge resistance, and a cooling device for cooling the power electronics arrangement, wherein the cooling device comprises a metallic cooling sink, wherein the discharge resistance is realized as a conductor track on an electrically insulating insulator layer at least partly directly covering the cooling sink, and wherein the cooling sink, the insulator layer, and a conductor layer forming the conductor track form an insulated metal substrate (IMS) structure, and wherein the cooling sink comprises a cooling duct on an inside thereof, through which a coolant can flow, and the power electronics module comprises a cooling structure, and the cooling structure extends into the cooling duct within the cooling sink.

14. The method according to claim 13, wherein the insulator layer is applied as a prepreg material.

15. The method according to claim 13, wherein at first a closed copper layer and/or a foil is applied to the insulator layer, from which the conductor track forming the discharge resistance is formed using a mask.

16. The method according to claim 13, wherein a thickness and a length of the conductor track are chosen so as to dictate a predetermined resistance value for the discharge resistance.

17. The method according to claim 13, wherein a semiconductor switch of the discharge circuit is also positioned on the insulator layer, connected to the conductor track.

18. The method according to claim 17, wherein the power electronics circuit realized as a power electronics module, after the realization of the discharge resistance, also after the applying of the semiconductor switch to the cooling sink, is mounted on the cooling sink such that contacts provided on the power electronics module electrically contact the discharge circuit at contact points.

* * * * *